United States Patent [19]
Bishop et al.

[11] Patent Number: 5,351,988
[45] Date of Patent: Oct. 4, 1994

[54] HYBRID INFLATOR WITH STAGED INFLATION CAPABILITY

[75] Inventors: Robert J. Bishop, Sterling Heights; Richard L. Frantom, Richmond; Robert M. Kremer; Klaus F. Ocker, both of Fraser, all of Mich.; Roy G. Brown, Hot Springs, Ark.; James Ross, Fairfax; Donald W. Renfroe, Haymarket, both of Va.

[73] Assignee: AlliedSignal Inc., Morristown, N.J.

[21] Appl. No.: 833,240

[22] Filed: Apr. 14, 1992

Related U.S. Application Data

[63] Continuation-in-part of Ser. No. 808,781, Dec. 17, 1991, abandoned, which is a continuation-in-part of Ser. No. 618,428, Nov. 27, 1990, Pat. No. 5,076,607.

[51] Int. Cl.$^5$ .............................................. B60R 21/26
[52] U.S. Cl. ........................................ 280/737; 222/5
[58] Field of Search ............... 280/737, 735, 741, 728, 280/736; 222/5; 137/68.2; 102/530, 531; 422/164, 165, 166

[56] References Cited

U.S. PATENT DOCUMENTS

| | | | |
|---|---|---|---|
| 3,741,580 | 6/1973 | Vos | 280/735 |
| 3,773,353 | 11/1973 | Trowbridge et al. | 280/737 |
| 3,786,843 | 1/1974 | Stephenson et al. | 280/737 |
| 3,806,153 | 4/1974 | Johnson | 280/737 |
| 3,874,695 | 4/1975 | Abe et al. | 280/735 |
| 3,966,224 | 6/1976 | Campbell et al. | 280/735 |
| 4,033,610 | 7/1977 | Shingu et al. | 280/737 |
| 5,022,674 | 6/1991 | Franton et al. | 280/741 |
| 5,076,607 | 12/1991 | Woods et al. | 280/737 |

Primary Examiner—Karin L. Tyson
Attorney, Agent, or Firm—Markell Seitzman

[57] ABSTRACT

An inflator comprising: a pressure vessel (10) for storing a quantity of stored inflation gas under pressure. The pressure vessel comprising a first burst disk (46) and a seal disk (310) both for selectively sealing same. The inflator (10) including a gas release mechanism (52, 300) for permitting the controlled, staged release of the inflation gas at determinable inflation rates. The gas release mechanism includes: a first pyrotechnic device, positioned outside of the pressure vessel and spaced from the first burst disk (46), including a piston (72) moved into a disk piercing position to rupture the first burst disk (46) in response to the buildup of pressure caused burning of a first quantity of propellant material (218). The bursting of the first burst disk permits the inflation gas to initially flow out of the pressure vessel at a determinable cold inflation rate, the piston thereafter provides a conduit to communicate the products of combustion of the burning propellant to the pressure means so as to increase the temperature of the inflation gas therein and thereby increase the rate of egress of the gas. The inflator (10) also includes a second pyrotechnic mechanism (300), positioned outside of the pressure vessel and spaced from the seal disk (310), for providing, when activated, additional products of combustion arising from burning of a second quantity of propellent material, the products of combustion opening the seal disk (310) and thereafter entering the pressure vessel to heat the inflation gas therein and thereby elevate the rate of egress of the inflation gas above the rate achievable by the first pyrotechnic device.

8 Claims, 3 Drawing Sheets

FIG. 2
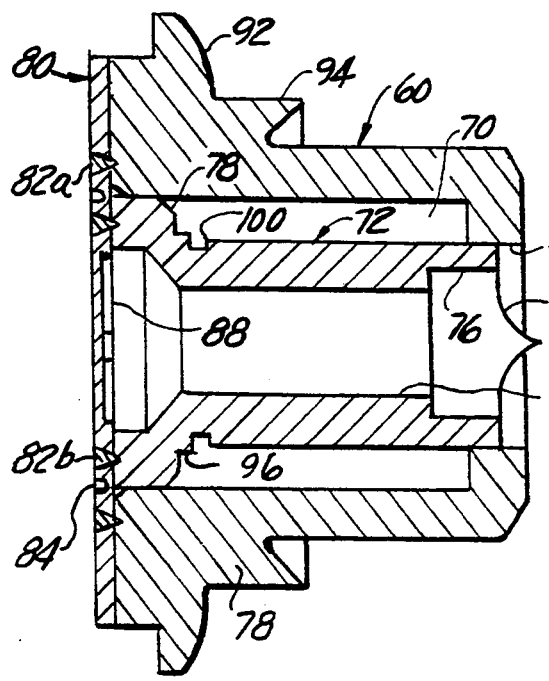
FIG. 8
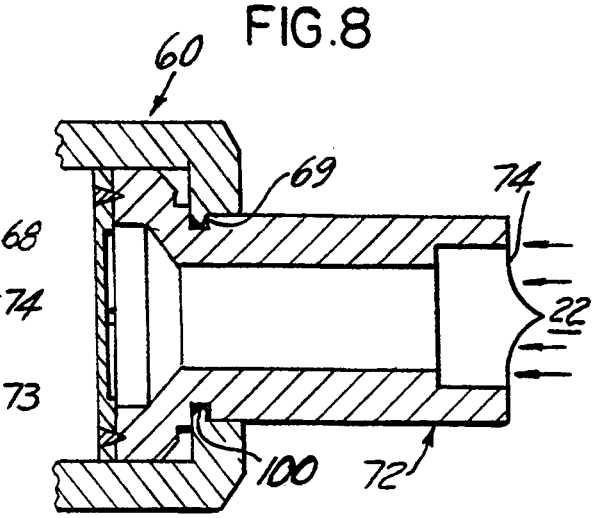
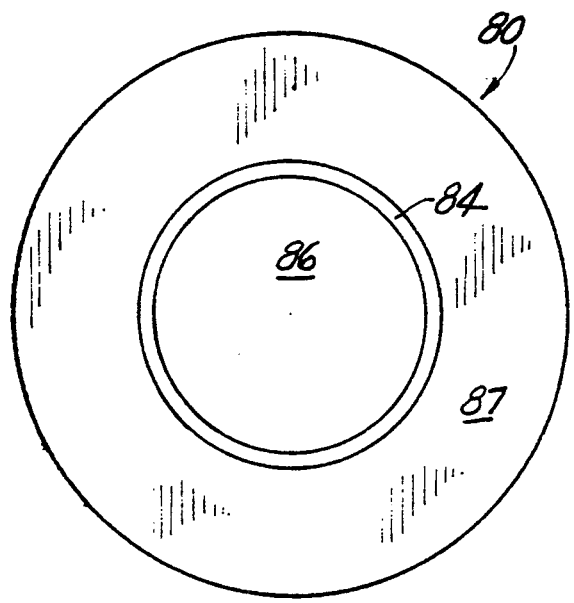
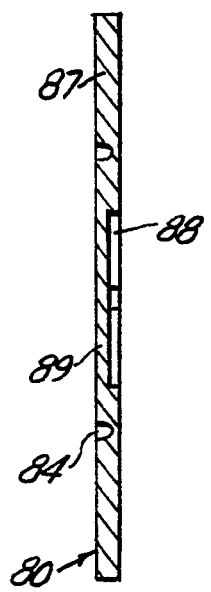
FIG. 3
FIG. 5

HYBRID INFLATOR WITH STAGED INFLATION CAPABILITY

The present application is a continuation-in-part of U.S. Ser. No 07/808,781 filed Dec. 17, 1991 abandoned, which is a continuation-in-part of U.S. Ser. No. 07/618,428, filed Nov. 27, 1990, now U.S. Pat. No. 5,076,607.

BACKGROUND AND SUMMARY THE INVENTION

The present invention generally relates to an inflator for an air bag or cushion and more specifically to the type of inflator known as a hybrid inflator.

It is known that if the early inflation rate of an air bag is too high, the resulting deployment forces can contribute to the possible injury of an occupant who is out of the normal seated (either driver or passenger) position. If, however, the air bag inflation rate is maintained at a relatively low value, primarily to reduce such deployment forces, full deployment of the air bag may not be timely achieved.

It has for some time been appreciated that one goal of air bag inflator design is to provide an inflator which initially has a relatively low or soft inflation rate (for a relatively few milliseconds) primarily to protect the out-of-position passenger, such as a standing child, who would be subject to large deployment forces and thereafter to rapidly increase the inflation rate of the air bag to cause rapid and full inflation. U.S. Pat. 3,758,131 illustrates one type of staged inflation device. The drawback of this inflator is that it utilizes three pyrotechnic elements. One element is used to open a burst disk to initiate inflation of an air bag by permitting inflation gas to exit in a cold unheated manner (cold inflation). Two other pyrotechnic elements are energized either simultaneously or sequentially to thereafter heat the stored inflation gas to provide increased, staged inflation or gas discharge rates of varying levels. In addition to the complexity of this design the cost of the inflator is prohibitive and also requires a three electronic activation circuits. The commonly owned U.S. Pat. No. 5,022,674 illustrates another type of hybrid inflator which using two pyrotechnic elements. While this patent shows a means for achieving various levels of air bag inflation by energizing each pyrotechnic element this type of inflator does not provide for a cold inflation capability. It is an object of the present invention to provide an inflator which using two pyrotechnic heating elements and one which includes a cold inflation capability.

Accordingly the invention comprises: an inflator comprising: a pressure vessel for storing a quantity of stored inflation gas under pressure. The pressure vessel means comprising a first burst disk and a seal disk both for selectively sealing same. The inflator including a gas release mechanism for permitting the controlled, staged release of the inflation gas at determinable inflation rates. The gas release mechanism including: a first pyrotechnic device, positioned outside of the pressure vessel and spaced from the first burst disk, including a piston moved into a disk piercing position to rupture the first burst disk in response to the buildup of pressure caused burning of a first quantity of propellant material. The bursting of the first burst disk permits the inflation gas to initially flow out of the pressure vessel at a determinable cold inflation rate, the piston thereafter provides a conduit to communicate the products of combustion of the burning propellent to the pressure means so as to increase the temperature of the inflation gas therein and thereby increase the rate of egress of the gas. The inflator also includes a second pyrotechnic mechanism, positioned outside of the pressure vessel and spaced from the seal disk, for providing, when activated, additional products of combustion arising from burning of a second quantity of propellant material, the products of combustion opening the seal disk and thereafter entering the pressure vessel to heat the inflation gas therein and thereby elevate the rate of egress and the amount of resulting pressure of the inflation gas above the rate and pressure achievable by the first pyrotechnic device.

Many other objects and purposes of the invention will be clear from the following detailed description of the drawings.

BRIEF DESCRIPTION OF THE DRAWINGS

In the drawings:

FIG. 2 illustrates an isolated view of a sleeve and piston.

FIGS. 3 thru 5 illustrate various views of a disk.

FIGS. 6 and 7 illustrate various views of the piston.

FIG. 8 illustrates the piston in its forward position.

FIG. 9 illustrates an alternate embodiment.

FIG. 10 illustrates a cross-sectional view of a pyrotechnic material.

DETAILED DESCRIPTION OF THE DRAWINGS

Figure 1:
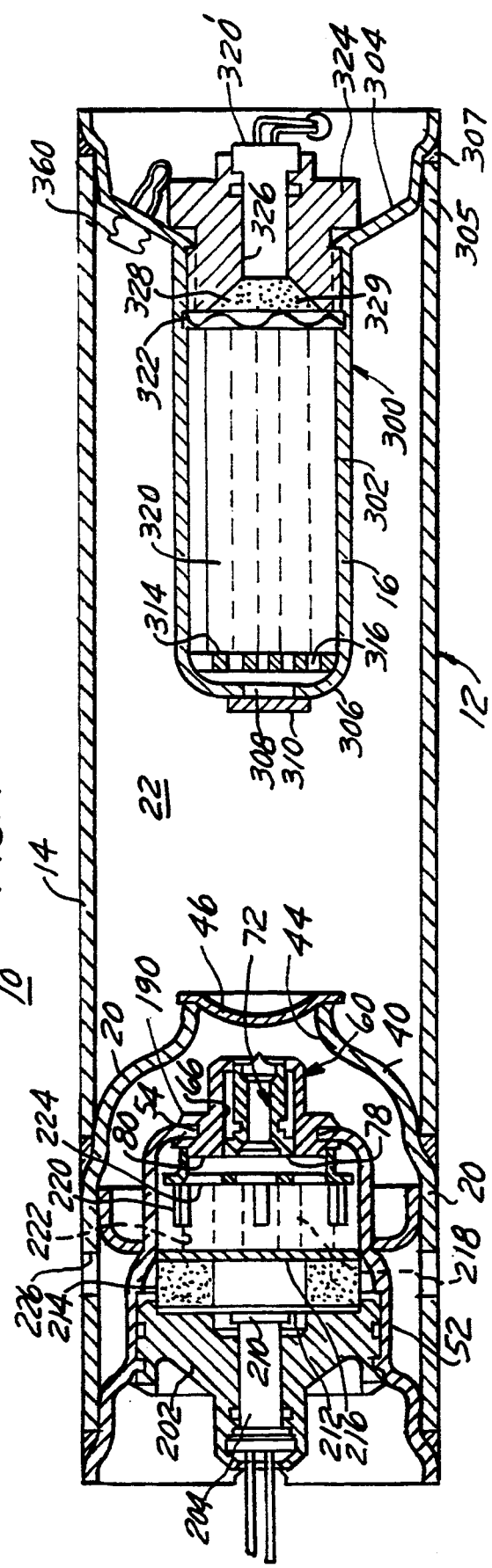
FIG. 1 illustrates a cross-sectional view of the present invention.
Figure 4:
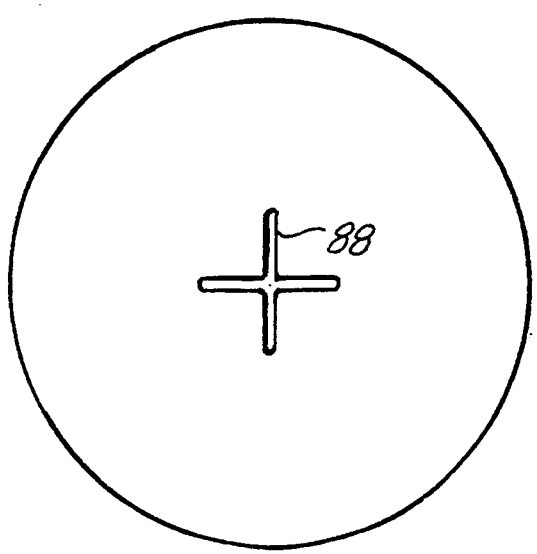

Reference is now made to FIG. 1 which illustrates an alternative hybrid inflator 10. The hybrid inflator 10 includes the pressure vessel 12 comprising cylindrical sleeve 14 enclosed by end caps 16 and 20. End cap 20 includes the necked down portion 40 defining opening 44 which is sealed by a rupture disk 46. Positioned within the inflator 10 apart from the Argon gas generally shown as 22, is a gas generator housing 52 defining an opening 54. Positioned within the opening 54 of the gas generator housing 52 is a sleeve 60. The sleeve 60 includes a stepped bore 70 (see FIG. 2) terminating at opening 68. Positioned within the bore 70 is is a hollow sliding piston 72. The piston 72 includes a cutting edge 74 which as described below penetrates the burst disk 46. The cutting edge 74 comprises two sharp points that taper to the full diameter of the piston. These points concentrate the available energy, creating localized stresses on the burst disk 46, and minimize the generator pressure required to drive the piston 72 through the burst disk 46. This action enhances the quick release of Argon gas 22. The piston 72 also includes a central bore 73. Under normal ambient temperature conditions, it can be appreciated that the diameter of bore 73 can effectively control the pressure in the gas generator which correspondingly controls the burn rate of the propellant. The control of the burn rate is effective in tailoring the rate of inflation of the air bag to the specific needs of the vehicle. The left end 78 or head of the piston 72 is slidingly received within the stepped bore 70. In the position as shown in FIG. 1, the piston 72 is initially retained to the sleeve 60 by use of a shear disk 80. The shear disk may be laser welded to the sleeve at circular weld joints shown as 82a and 82b. An end view of the shear disk 80 is shown in FIG. 3. The shear disk 80 includes a circular stress riser groove 84 which provides for the controlled separation of a central portion 86 of the disk from its outer portions 87 which faces the piston 72. The shear disk 80 also includes a second stress riser 88 in the central portion 86 comprising intersecting grooves, which in the preferred embodiment takes the shape of an X or T (see FIG. 4). This stress riser 88 determines the pressure at which the central portion 86 of the shear disk 80 will rupture due to the buildup of pressure on the face 89. A cross-sectional view of the shear disk 80 is shown in FIG. 5.

Reference is again made to FIG. 2 and in particular to the sleeve 60. As can be seen, the outer surface of the sleeve 60 is stepped. The sleeve includes an outer, arcuately shaped flange 92 having a shape that is generally conformal with the inner wall of the gas generator housing 52 proximate the central opening 54. The sleeve 60 also includes a second flange 94. In FIG. 2 the flange 92 is shown in its pre-assembled condition. During assembly, the sleeve 60 with the rupture disk 80 and piston 72 are slid within opening 54 of the gas generator housing 52. Thereafter, the flange 94 is bent outwardly resulting in the configuration shown in FIG. 1, thereby securing the sleeve 60 to the gas generator housing 52.

Reference is made to FIGS. 6 and 7 which illustrate various views of the piston 72 and more clearly show the cutting edges 74 formed thereon. As can be seen from FIG. 7 as well as FIG. 2, the piston includes a stepped annulus 96 the diameter of which is slightly larger than the diameter of the elongated portion 98 of the piston 72. The diameter of the annulus 96 is also slightly larger than the diameter of the opening 68 of the sleeve 60. The piston 72 also includes an annular groove 100. The purpose of the groove 100 and annulus 96 will be discussed below. As mentioned above, the diameter of the opening 68 is sized to be smaller than the annulus 96 formed on the piston 72. This difference in dimension will provide for an interference fit between the piston 72 and sleeve 60. As can be appreciated, as the piston 72 is thrust forwardly by the pressure exerted thereon which may be 5000 psi, the larger annulus 96 impacts the sleeve 60 proximate opening 68 to create the interference fit and stops or decelerates the piston, thereby reducing the stresses on the piston head. It is believed that as the annulus impacts the sleeve 60, the sleeve is slightly deformed about the opening 68 to create a ridge or burr 69. As mentioned earlier, the piston 72 includes an annular groove 100. This annular groove 100 is positioned slightly to the right of the piston head 74 and annulus 96. In the forward or burst disk piercing position shown in FIG. 8, the groove 100 interferes with the burr 69 which is effective to prevent the piston from moving rearwardly thereby improving the retention of the piston in its stroked position.

Reference is again made to FIG. 1. The inflator 10 includes an initiator housing 202, a squib 204 secured therein, a small quantity of ignition enhancing material 210 such as boron potassium nitrate, which is sealed to the housing 202 by a thin metal foil layer 212. Situated to the right of the initiator housing 202 is a sponge or spring element 214 and a screen 216. A quantity of molded or extruded propellant 218 is also placed within the gas generator housing 52 which is secured by the metal retainer 220. The propellant includes a plurality of axial passages 222 which are coaxial with openings 224 formed in the retainer 220. The ignition enhancing material 210 is designed to ignite at a lower temperature than the auto ignition temperature of the propellant 218. This feature assures that if the vehicle were involved in a fire or if the inflator itself were to burn, such as being placed in a disposal fire, that the propellant 218 is ignited at a low enough temperature that its burn rate and pressure generation is controlled through the piston nozzle, i.e., bore 73.

The inflator 10 also includes another gas generator housing assembly 300 comprising a stepped housing 302 having an enlarged end 304 mating with the other end 305 of the sleeve 14 of the pressure tank 14. The sleeve 12 and housing 302 are joined at a circumferential weld 307. The housing 302 at its inner end 306, includes a central opening 308, covered by a thin disk or seal 310 typically fabricated of stainless steel. The disk 310 is welded to the housing 302 in a manner as discussed above.

FIG. 9 illustrates an alternate embodiment of the generator housing assembly 300 in which the end 306, at the previous location of the opening 308, includes a plurality of smaller openings 312, covered by the burst disk 310. In this embodiment the housing 302 material, between the openings 312, provides additional support for the burst disk 310, permitting same to be made significantly thinner than the burst disk 310 shown in FIG. 1. Positioned within the hollow interior of the housing 302 is a grain trap 314 having a plurality of openings 316 therein, which prevent extrusion of the burning propellant 320 into the openings 316. Upstream of the grain trap is a quantity of extruded or shaped propellant 320. The propellant 320 may be Arcite such as that disclosed in U.S. Pat. Nos. 3,723,205 or in 4,981,534, which is incorporated herein by reference.

The propellant 320 is biased against the grain trap 314 by a wave washer 322. The thickness of this resilient member, i.e., wave washer 322, may be varied to accommodate varying lengths of propellant 320. Threadably received within the housing 302 is a housing 324 of having a central opening 326 which terminates at one end thereof in a conical, divergent nozzle 328. Received within the opening 326 is another detonator or initiator 320 of known design, having a plurality of electrical leads attached thereto. Within the divergent nozzle 328 is an ignition enhancing material 329 comprising boron potassium nitrate whose flame temperature and quantity are suitable for instantaneously igniting the propellant 320.

With reference to FIG. 10, this figure illustrates a cross-sectional view of the propellant 320. The exterior 330 of the propellant 320 is formed in a cloverleaf-type pattern with each cloverleaf having a central opening 322. The purpose of this construction is to provide for a relatively constant propellant burn rate.

The gas generator housing assembly 300, or alternatively, the housing assembly 52, may further include provision for a fill tube 360 or similar functioning means for filling and sealing the tank 12.

Figure 11:
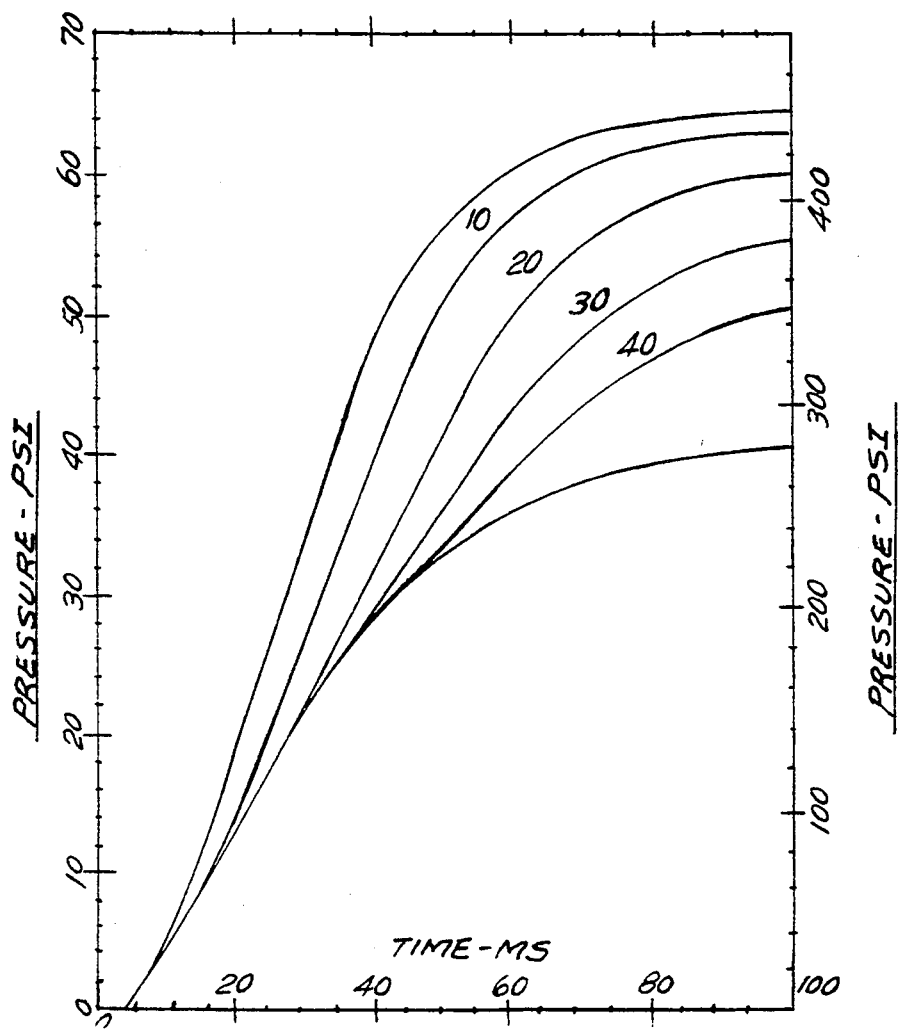
FIG. 11 illustrates simulated inflation profiles using the present invention.

The dual pyrotechnic configuration of the present invention yields flexibility in that the rate of inflation of the air bag can be controlled. As can be appreciated, the air bag is mounted in communication with the inflator to received the inflation gas. The inflator is activated by a crash sensor not shown and associated electronic sensing circuits known in the art. The preferred type of crash sensor and electronics are those which can discriminate between the level of deceleration or velocity to determine whether or not the vehicle is involved in a high, low, etc. level crash. Such crash sensors/systems are presently available. In response to a low level crash signal, for example between 10 to 18 miles an hour, the first initiator 204 is activated causing the bursting of the disk 46 and low rate inflation of the air bag. Upon receiving a high level crash signal, corresponding to a crash at 18 to 35 miles per hour for example, both initiators 204 and 320 are activated. This activation can be simultaneous or the activation of initiator 320 can be delayed appropriately. It is envisioned that the crash signal for such a "low level crash" will be determined such that the threshold is set to protect a statistically significant number of vehicle occupants involved in all crashes, or in a particular type of vehicle in which the inflator is installed. FIG. 11 illustrates the simulated inflation of an air bag by releasing the inflation gas into a test tank of 100 Liter volume. Such a procedure is known in the art. The lower curve of FIG. 11 illustrates the tank pressure (i.e. air bag inflation) that can be expected for a low level crash (the lowest curve), the simultaneous activation of both pyrotechnic elements (curve 0, for a zero time delay) and the inflation profiles for delays of 10 to 40 milliseconds. It should be appreciated that the inflation characteristics can be further tailored by varying the quantity of propellant to be burned, its time of burn, the pressure of the stored gas and volume of the pressure vessel 12.

Many changes and modifications in the above described embodiment of the invention can, of course, be carried out without departing from the scope thereof. Accordingly, that scope is intended to be limited only by the scope of the appended claims.

We claim:
1. An inflator (10) comprising:
a pressure means (12, 14, 16, 20) for storing a quantity of inflation gas under pressure, the pressure means comprising a first housing having a first part extending into the pressure means and a second part in contact with the pressure means for sealing one end of the pressure means, the first part including an opening closed by a first burst disk (46) and a second housing (302) having a first part extending into the pressure means and a second part in contact with the pressure means for closing a second end of the pressure means, the first part of the second housing including at least one additional opening closed by a seal disk (310);
gas release means (52, 300) for permitting the controlled, staged release of the inflation gas at determinable inflation rates, such gas release means including:
first pyrotechnic means, for generating products of combustion for heating the stored gas, positioned outside of the pressure means and spaced from the first burst disk (46), including a piston (72) moved into a disk piercing position to rupture the first burst disk (46) in response to the buildup of pressure caused burning of a first quantity of propellant material (218), the bursting of the first burst disk permitting the inflation gas to initially flow out of the pressure means at a determinable cold inflation rate, the piston thereafter providing a conduit to communicate the products of combustion of the burning propellent to the pressure means so as to increase the temperature of the inflation gas therein and thereby increase the rate of egress of the gas;
second pyrotechnic means (300), positioned in the second housing, positioned outside of the pressure means and spaced from the seal disk (310), for providing, when activated, additional products of combustion arising from burning of a second quantity of propellant material, the products of combustion opening the seal disk (310) and thereafter entering the pressure means to heat the inflation gas therein and thereby elevate the rate of egress of the inflation gas above the rate achievable by the first pyrotechnic means.

2. The inflator as defined in claim 1 wherein the first pyrotechnic means includes
a hollow sliding piston (72) having an opening and including at one end thereof first means (74) for puncturing the first burst disk (46);
a shear disk (80) having a stationary outer portion (87) and a central or inner portion (86), the central portion secured to one end of the piston (72) opposite the first means (74) and the central portion capable of separating from the outer portion and moving with the piston (72), the central portion functioning as a second burst disk, a portion of the shear disk radially outward of the portion of the disk connected to the piston is weaker than the central portion;
the first quantity of propellant material (218) provided near the second burst disk (80), said propellant material producing gaseous combustion products when burned;
the piston being propelled into the first burst disk (46) after the central portion (86) of the shear disk separates from the outer portion in response to the build up of pressure generated due to the burning of a propellant material (218), thereby permitting the egress of the stored inflation gas, the central portion (86) being ruptured by the continued build up of pressure due to the burning propellant material whereupon after the rupturing of the second burst disk the heated products of combustion resulting from the burning propellant material flow through the sliding piston (72) to increase the temperature of the stored inflation gas prior to its exit from the inflator.

3. The inflator (10) as defined in claim 1 wherein the volume of the pressure means, the pressure at which pressurized inflation gas is stored therein, the first quantity of propellant material and the heat generated thereby are selected such that the rate of inflation gas flow communicated to a coacting air bag is sufficient to inflate the air bag to a first level during a vehicular accident above a threshold crash level and below a second crash level.

4. The inflator (10) as defined in claim 3 wherein the second pyrotechnic means is activated after or simultaneously to the activation of the first pyrotechnic means, wherein the quantity of second propellent material and the heat generated thereby cause the air bag to be inflated at a rate greater than that achieved by activation of the first pyrotechnic means during a vehicular accident of between the second crash level and a third crash level.

5. The inflator as defined in claim 4 wherein the threshold and second accident levels are each respectively in a range from approximately 10–18 and 18–35 miles hour.

6. The inflator (10) as defined in claim 3 wherein the threshold level corresponds to one of vehicle deceleration or vehicle crash velocity at which most injury crashes occur.

7. The inflator as defined in claim 1 wherein a plurality of openings (312) are at one end of the second housing interior of the pressure means, and wherein the seal disk (310) is positioned upon an exterior wall of the second housing to seal the plurality of opening, the seal disk being opened, to expose the plurality of openings, to the products of combustion produced upon activation of the second pyrotechnic means.

8. The inflator as defined in claim 2 wherein the gas release means includes means for activating the first and second pyrotechnic means with a time delay between such activations in proportion to the severity of a crash.

* * * * *